UNITED STATES PATENT OFFICE.

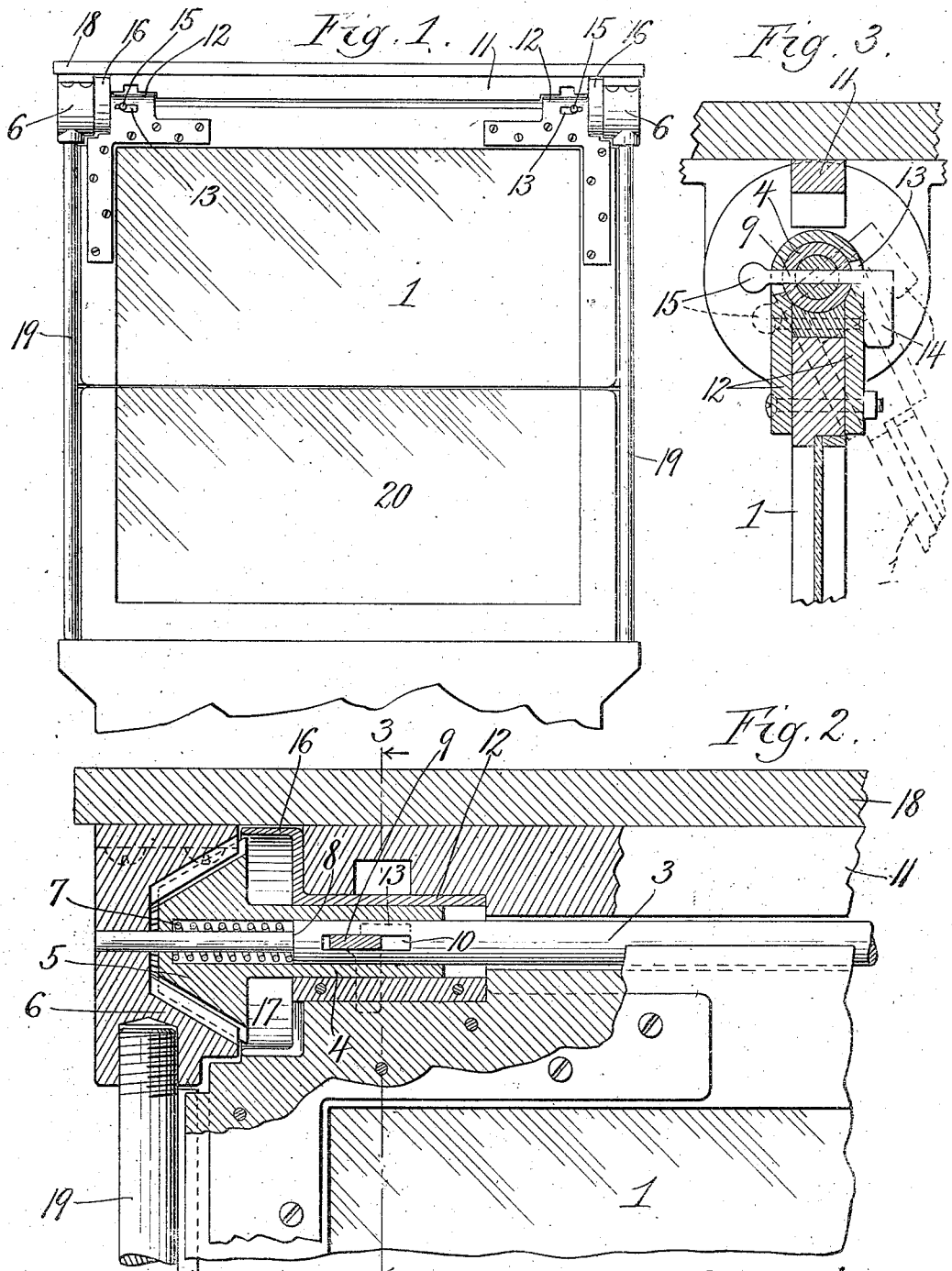

PORTER EDWARDS STONE, OF CHICAGO, ILLINOIS.

WIND-SHIELD.

1,170,700.

Specification of Letters Patent.

Patented Feb. 8, 1916.

Application filed December 16, 1910. Serial No. 597,629.

*To all whom it may concern:*

Be it known that I, PORTER E. STONE, a citizen of the United States, residing at Chicago, in the county of Cook and State of Illinois, have invented a certain new and useful Improvement in Wind-Shields, of which the following is a specification.

This invention relates to an article of manufacture particularly adapted for use in connection with wind shields, and has for its object to provide a new and improved device of this description.

The invention is illustrated in the accompanying drawings, wherein—

Figure 1 is a view of the device as applied to a wind shield in connection with an automobile; Fig. 2 is a view in part section showing the operating and holding mechanism for the shield; Fig. 3 is a sectional view taken on line 3—3 of Fig. 2.

Like numerals refer to like parts throughout the several figures.

In the drawings I have illustrated the device as applied to a closed automobile body. The wind shield 1 is movably supported in position. Connected with the wind shield is a rod 3. Mounted upon one end of the rod 3 is a sleeve 4, carrying a toothed wheel 5, which in the drawing is shown as a beveled pinion. Connected with a stationary part is a hollow portion 6 provided with teeth which engage the teeth on the toothed wheel 5. A spring 7 engages the wheel 5 and a shoulder 8 on the rod 3 and normally holds the teeth of the wheel 5 and the part 6 in engagement. A controlling part 9 passes through an elongated slot 10 in the rod 3, and is fastened to the sleeve 4. This part prevents the pinion from rotating with relation to the rod 3, but permits it to be moved longitudinally with relation thereto to disengage its teeth from the teeth of the hollow portion 6. The frame 11 of the wind shield is cut away so as to receive the hollow portion 6 and wheel 5 and leave space for the movement of said wheel. The sleeve 4 is mounted in a bracket 12 fastened to the frame of the wind shield. This bracket is slotted at 13, and the controlling part 9 projects therethrough. This controlling part is provided with a handle piece 14 on the inside of the wind shield, by means of which it can be easily controlled. The end 15 of the controlling part projects beyond the bracket 12 on the outside of the wind shield so that the wind shield can be easily controlled from the outside of the car. An inclosing piece 16 is connected with the bracket 12 and incloses the space 17 in which the wheel is moved in disengaging it from the hollow portion 6. The hollow portion 6 is connected to a fixed part in any desired manner, as by being connected to the top 18 of the automobile body and to the rod 19. In the construction shown there is a fixed wind shield 20 below the adjustable wind shield 1. The wind shield may have the wheel 5 and associated parts at one side only or at both sides, as shown in the drawing.

When it is desired to move the wind shield, the operator grasps the handle piece 14 and moves the controlling part 9, sleeve 4 and pinion 5 against the pressure of the spring 7; that is, to the right in Fig. 2, so as to disengage the teeth of the wheel 5 and hollow portion 6. The wind shield may then be moved to any desired angle. When the controlling part 9 is released the spring then moves the teeth of the wheel 5 into engagement with the teeth of the hollow portion 6, and holds the wind shield in this position.

I claim:

1. An article of manufacture comprising a frame, a rod connected with said frame, a sleeve slidably mounted upon said rod, a toothed wheel at the end of said sleeve and larger in diameter than the sleeve, a fixed toothed part in proximity to said toothed wheel and adapted to engage said wheel and prevent its rotation, and a controlling device for moving said toothed wheel so as to permit the frame to be moved to various positions.

2. An article of manufacture comprising a frame, a rod connected with said frame, a support with which said rod is connected, a tooth part on said support, a tooth wheel slidably mounted on said rod and engaging said tooth part, a projecting sleeve connected with said wheel and smaller in diameter than the wheel, a hollow inclosing piece connected with said frame and into which said wheel is received when moved to its disengaging position, a projecting bracket connected with said hollow inclosing piece and in which said sleeve is slidably mounted, and means for moving said sleeve in said bracket and longitudinally along said rod.

3. An article of manufacture comprising a frame movably mounted in position, a toothed wheel connected with said frame so as to be free to move in the direction of its axis, a rod extending through said wheel, a sleeve connected with said wheel, a bracket through which said rod passes, said sleeve projecting into said bracket, a fixed toothed part adapted to engage said toothed wheel, said bracket sleeve and rod provided with longitudinal openings extending therethrough, said openings registering, and a controlling device extending through said openings for moving said toothed wheel in the direction of its axis to disengage it from the fixed part.

4. An article of manufacture comprising a frame mounted so that it can be moved to various positions, a rod connected with said frame, a sleeve slidably mounted on said rod, a toothed wheel connected with said sleeve, a fixed part having teeth which engage the teeth of said toothed wheel to hold the frame in any desired position, a controlling part for said toothed wheel extending through said sleeve and said rod, and a bracket surrounding said sleeve and fixed to said frame.

5. An article of manufacture comprising a frame for vehicles movably mounted in position and provided with a toothed wheel, a rod extending through said toothed wheel, a fixed part having teeth engaging the teeth of the toothed wheel to hold the shield in position, said toothed wheel mounted upon said rod so that it may be moved in the direction of its axis to disengage its teeth from those of the fixed part, a bracket connected with said frame and provided with an inclosing part into which said toothed wheel is moved when moved to its unlocked position, said rod projecting from both sides of said bracket.

6. An article of manufacture comprising a frame, a locking part connected with said frame, comprising a series of converging teeth, a stationary hollow coöperating locking part provided on its inner face with coöperating converging teeth and into which the locking part connected with the frame is received, and means for separating said coöperating, converging teeth to vary the position of said frame and a retracting spring contained within said locking part on said frame.

PORTER EDWARDS STONE.

Witnesses:
   EDNA K. REYNOLDS,
   SOPHIE B. WERNER.